United States Patent Office 3,223,739
Patented Dec. 14, 1965

3,223,739
POLYMERIZATION OF TETRAFLUOROETHYLENE AND PREPARATION OF FLUOROCARBON WAXES
Fred N. Teumac, 134 Sage, Lake Jackson, Tex.
No Drawing. Filed Aug. 2, 1963, Ser. No. 299,467
4 Claims. (Cl. 260—653.1)

This invention relates to the polymerization of tetrafluoroethylene and to the preparation of fluorocarbon waxes. It relates more particularly to a method and catalyst for polymerizing tetrafluoroethylene and pertains to the preparation of fluorocarbon waxes from said polytetrafluoroethylene.

It is known to polymerize tetrafluoroethylene by contacting vapors thereof with a catalyst such as silica. It is also known to prepare fluorocarbon waxes by degradation or decomposition of polytetrafluoroethylene at elevated temperatures.

It has now been discovered that normally solid polytetrafluoroethylene can readily be prepared by contacting vapors of tetrafluoroethylene at superatmospheric pressures and elevated temperatures of from about 140° to 300° C. with cesium fluoride as polymerization catalyst or initiator.

It has further been found that the solid polytetrafluoroethylene prepared in said manner can readily be converted to fluorocarbon waxes by heating the same at elevated temperatures between about 325° and 450° C. at atmospheric pressure or thereabout or at subatmospheric pressure.

In the process of converting the polytetrafluoroethylene to fluorocarbon waxes it has been found that the waxes possess different melting points depending upon whether the polytetrafluoroethylene is decomposed at atmospheric pressure or thereabout or under vacuum, i.e. at subatmospheric pressures of 100 millimeters of Hg or less, absolute pressure. In general, the fluorocarbon waxes obtained by pyrolyzing the polytetrafluoroethylene under subatmospheric pressure have a melting point range of from 220° to 228° C., and the waxes obtained by pyrolysis of the polymer at atmospheric pressure or thereabout have a melting point range of from about 270° to 277° C.

The fluorocarbon waxes are useful for a variety of purposes in the home and industry. They are distinguished for example, by their anti-friction properties and are useful as greases, lubricants and mold release agents.

In practice, the solid polytetrafluoroethylene, i.e. the homopolymer, is readily prepared by contacting vapors of the monomeric tetrafluoroethylene with cesium fluoride in a suitable pressure resistant vessel at temperatures between about 140° and 300° C., preferably from 140°–220° C. The polymerization is usually carried out by feeding the gaseous tetrafluoroethylene to the reaction vessel at room temperature or thereabout under the autogeneous pressure of the monomer and allowing it to polymerize as monomer is fed to the reaction until a desired quantity of polymer is obtained. Thereafter, feed of the monomer is discontinued, and after substantial polymerization of the remaining monomer in the reaction zone, the polymer is recovered and is washed with water to remove the catalyst and is dried. The cesium fluoride catalyst can be recovered from the aqueous solution by evaporation of the water, and be reused in the process.

The polytetrafluoroethylene product is a polymer of high molecular weight and can be pressed, shaped or molded and sintered to form useful articles. In a preferred embodiment the solid polytetrafluoroethylene product is employed as starting material for the preparation of fluorocarbon waxes by a pyrolysis carried out at elevated temperatures between about 325 and 450° C. and at atmospheric pressure or thereabout, or at subatmospheric pressure, as herein described.

The pyrolyzing of the polytetrafluoroethylene, prepared by polymerization of the monomer in contact with cesium fluoride as catalyst or initiator, can be carried out at atmospheric pressure or thereabout, or in vacuum, i.e. at subatmospheric pressures of 10 millimeters of Hg or less, or at any pressures inbetween, but is advantageously and preferably carried out at either atmospheric pressure or in vacuum, so that one obtains the fluorocarbon waxes of relatively narrow melting point temperature range as hereinbefore stated.

In carrying out the pyrolysis of polytetrafluoroethylene, the conversion of the polymer to waxes and volatile products is complete or substantially complete, leaving a small amount of carbon, usually a highly activated carbon, as by-product residue. The yield of waxes is usually about 60 percent based on the weight of the polymer initially used, the remainder being low boiling fluorocarbons and a small amount of carbon as previously mentioned.

The following examples illustrate ways in which the principle of the invention has been applied, but are not to be construed as limiting its scope.

*Example 1*

A charge of 10 grams of cesium fluoride, CsF, was placed in a glass reaction vessel and was heated in the vessel at temperatures of about 100° C., under vacuum for a period of about 16 hours. Thereafter, the vessel was filled with tetrafluoroethylene vapors under a pressure of 60 pounds per square inch gauge pressure from a supply tank. The tetrafluoroethylene and CsF in the reaction vessel were heated and maintained at temperatures between 145° and 155° C. Polymerization of the monomeric tetrafluoroethylene was indicated by flow of gas into the reaction vessel, and as the monomer was consumed by fall of the pressure in the reaction vessel to a value below about 10 millimeters absolute pressure. The vessel was cooled and the solid polymer was recovered. In a reaction period of 8 hours, there was obtained 327 grams of a white solid polymer that was identified as polytetrafluoroethylene.

*Example 2*

A portion of the polytetrafluoroethylene prepared in Example 1 above was heated for 1.5 hours at 400° C. and atmospheric pressure in a glass reaction vessel. As the heating was continued gaseous products were evolved and conducted away from the reaction zone and condensed. The gaseous products condensed to a light yellow or amber colored wax melting at 270–277° C.

*Example 3*

Another portion of the polytetrafluoroethylene prepared in Example 1 above was heated for 1.5 hours at 400° C. in vacuum, i.e. under not more than 5 millimeters of mercury absolute pressure. The gaseous products that were evolved were cooled to condense the volatile products therein. There was obtained a white waxy solid melting at 220°–228° C.

I claim:

1. A process for polymerizing tetrafluoroethylene which comprises contacting vapors of monomeric tetrafluoroethylene with cesium fluoride at temperatures between about 140° and 300° C. and superatmospheric pressure.

2. A process which comprises contacting vapors of tetrafluoroethylene with cesium fluoride at temperatures between about 140° and 300° C. and superatmospheric pressures up to 180 pounds per square inch gauge pressure and recovering the solid homopolymer.

3. A process for the manufacture of fluorocarbon waxes which comprises heating polytetrafluoroethylene, prepared by contacting tetrafluoroethylene with cesium fluoride at temperatures between 140° and 300° C. and superatmospheric pressure, in a reaction zone at temperatures between about 325° and 450° C., and cooling the evolved vapors to condense the fluorocarbon wax product.

4. A process for the manufacture of fluorocarbon waxes which comprises heating polytetrafluoroethylene, prepared by contacting tetrafluoroethylene with cesium fluoride at temperatures between 140° and 300° C., in a reaction zone at temperatures between 325 and 450° C., at subatmospheric pressure and cooling the evolved vapors to condense the fluorocarbon wax product.

References Cited by the Examiner

UNITED STATES PATENTS

| | | | |
|---|---|---|---|
| 2,496,978 | 2/1950 | Berry | 260—92.1 |
| 2,932,633 | 4/1960 | Juveland et al. | 260—92.1 |
| 2,969,403 | 1/1961 | Frey et al. | 260—653.1 |
| 2,978,519 | 4/1961 | Fischer | 260—653.1 |

LEON ZITVER, *Primary Examiner.*

DANIEL D. HORWITZ, *Examiner.*